United States Patent [19]

Aileo et al.

[11] E Patent Number: Re. 32,569

[45] Reissued Date of Patent: Jan. 5, 1988

[54] PROTECTIVE HELMET

[75] Inventors: Jackson A. Aileo, Carbondale; Leonard P. Frieder, Jr., Dalton, both of Pa.

[73] Assignee: Gentex Corporation, Carbondale, Pa.

[21] Appl. No.: 515,217

[22] Filed: Jul. 20, 1983

Related U.S. Patent Documents

Reissue of:

[64] Patent No.: 3,897,596
Issued: Aug. 5, 1975
Appl. No.: 500,547
Filed: Aug. 26, 1974

[51] Int. Cl.[4] ..... A42B 3/00

[52] U.S. Cl. ..... 2/416; 2/6; 2/420; 2/171.1

[58] Field of Search ..... 2/416, 417, 418, 419, 2/420, 421, 6; 2/171.1

[56] References Cited

U.S. PATENT DOCUMENTS

| | | | |
|---|---|---|---|
| 2,177,145 | 10/1939 | Lewis | 2/416 |
| 2,351,235 | 6/1944 | Shroyer et al. | 2/416 |
| 2,739,309 | 3/1956 | Frieder et al. | 2/3 R |
| 2,805,419 | 9/1957 | Funken | 2/423 |
| 2,853,708 | 9/1958 | Austin | 2/416 |
| 2,855,604 | 10/1958 | Austin | 2/416 |
| 2,983,923 | 5/1961 | Aileo | 2/418 |
| 3,154,788 | 11/1964 | Simpson | 2/418 |
| 3,223,086 | 12/1965 | Denton | 2/6 X |
| 3,353,188 | 11/1967 | Crincic | 2/171.1 X |
| 3,442,459 | 1/1969 | Bowers, Jr. | 2/416 |
| 3,613,114 | 10/1971 | Hill et al. | 2/416 |
| 3,958,276 | 5/1976 | Clausen | 2/2.5 |

FOREIGN PATENT DOCUMENTS

| | | | |
|---|---|---|---|
| 0865015 | 2/1941 | France | 2/416 |
| 0323631 | 12/1934 | Italy | 2/417 |
| 0350142 | 6/1931 | United Kingdom | 3/420 |
| 0539577 | 9/1941 | United Kingdom | 2/6 |

*Primary Examiner*—Peter Nerbun
*Attorney, Agent, or Firm*—Shenier & O'Connor

[57] ABSTRACT

An improved protective helmet for use by an infantryman or the like in which a suspension frame of relatively rigid material has a peripheral channel provided at one location around the frame with a slightly inwardly inclined portion adapted to receive a slightly outwardly directed portion of the edge of a rigid outer ballistic helmet body to permit the body to be swung to a position in which the entire edge thereof is received in the channel and in which position the body is securely held by a single fastener. The frame is formed with a plurality of generally upwardly extending fingers which removably receive envelopes carrying pads of resilient material which adapt the frame to accommodate a range of head sizes. A light line or cord is threaded through holes and slots around the frame releasably to secure both the crown assembly straps and the chin strap supports to the frame while maintaining the positions of the strap ends at predetermined locations around the frame. The helmet body is formed of ballistic material sandwiched between rigid molded inner and outer shells.

49 Claims, 10 Drawing Figures

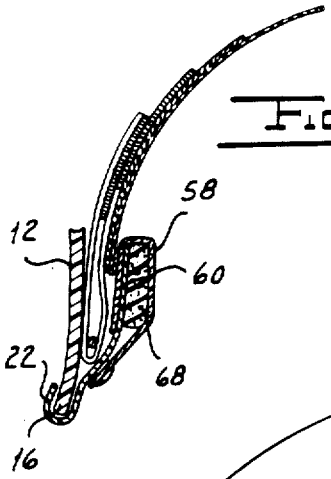
Fig 3
Fig 4
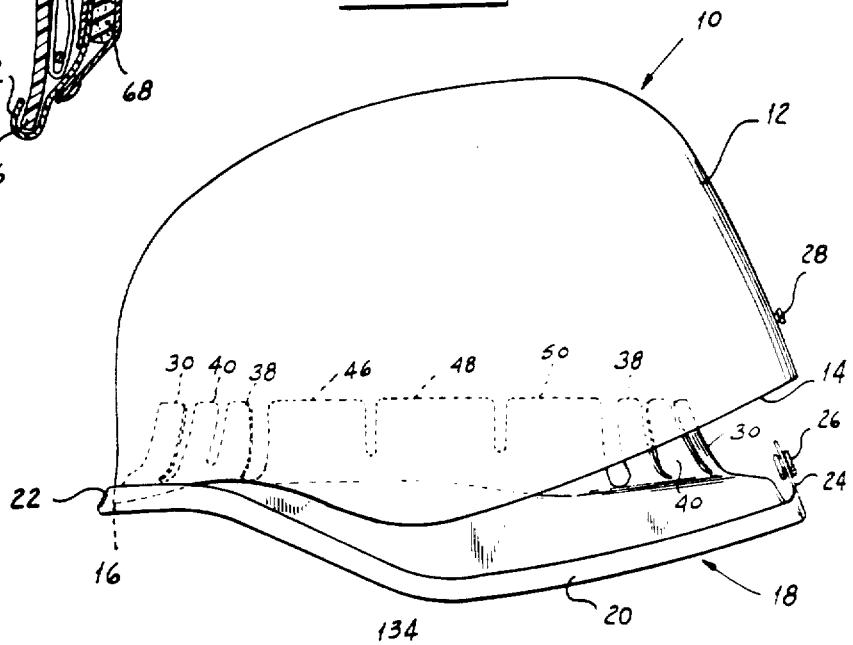
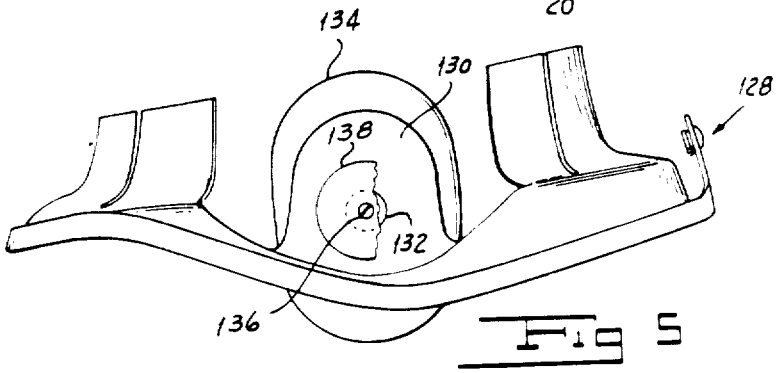
Fig 5

Fig 7
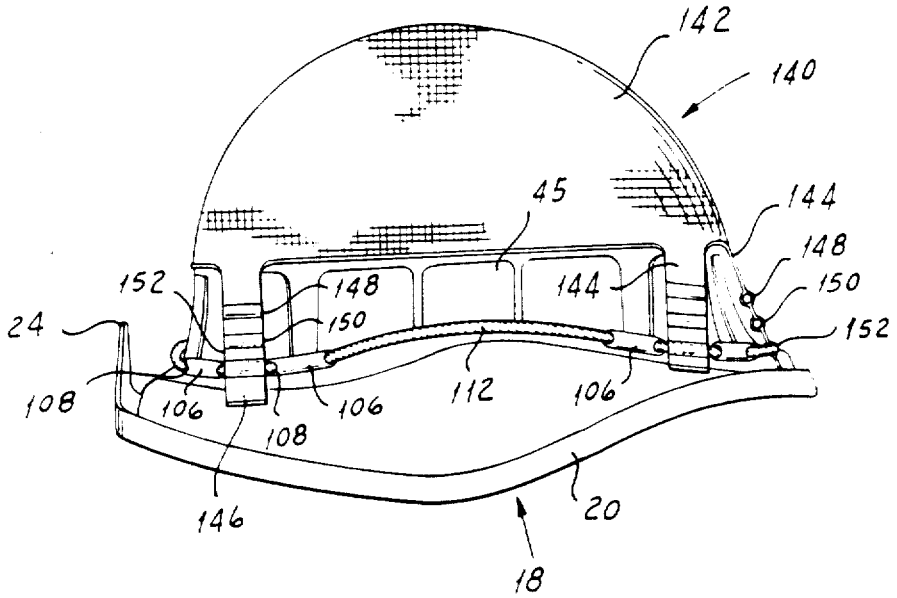
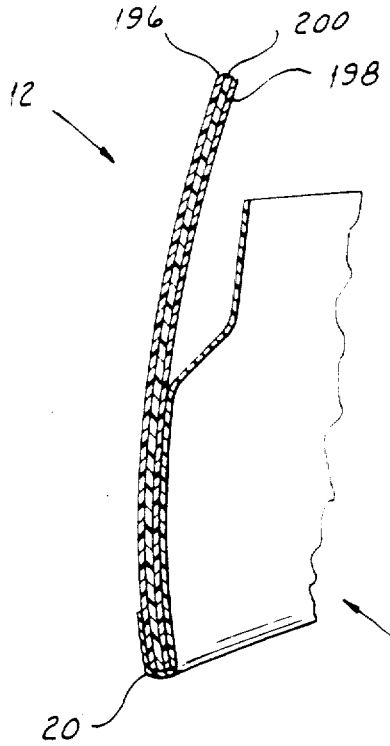
Fig 6

Fig 8
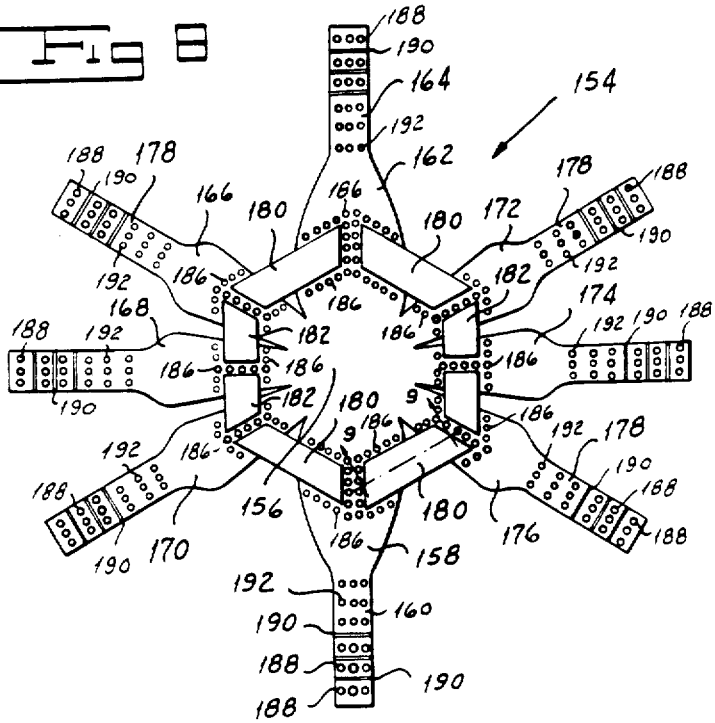
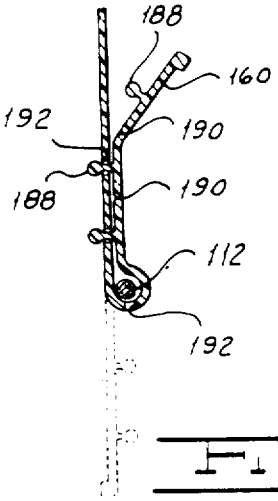
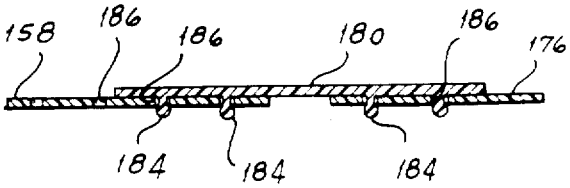
Fig 9
Fig 10

PROTECTIVE HELMET

Matter enclosed in heavy brackets [ ] appears in the original patent but forms no part of this reissue specification; matter printed in italics indicates the additions made by reissue.

BACKGROUND OF THE INVENTION

There are known in the prior art various forms of protective helmet for use by military personnel such as infantrymen to protect the head of the wearer against injury from missiles and shrapnel. All of these helmets of the prior art incorporate some form of suspension system for supporting the helmet in position on the wearer's head. Most of the headband suspensions are secured to the rigid helmet body by the use of metal fasteners such as screws, for example. One type of such a helmet and suspension assembly is shown in Frieder et al U.S. Pat. No. 2,739,309. These helmet and suspension assemblies of the prior art incorporate a number of more or less serious defects. First, the metal fasteners which are used to secure the suspension to the helmet shell often act as secondary missiles when struck by a piece of flying shrapnel or the like. As a result, the wearer may suffer a more serious injury than that which would occur from the shrapnel. Secondly, suspension systems of the prior art permit "bottoming" of the hard outer shell on the wearer's head under the force of an impact on the outer shell, with the attendant danger of injury to the wearer.

In addition to the defects pointed out hereinabove, the protective helmet assemblies of the prior art suffer from a number of disadvantages. Generally adjustment of the size of the suspension is difficult to accomplish. Most of the suspensions of the prior art accommodate only a very small range of head sizes. The helmets of the prior art are heavy. Suspensions of the prior art are permanently attached to the rigid shell with the result that the parts thereof are difficult to clean.

There have recently been developed a class of materials including aromatic polyimide resins which have been found to have superior ballistic properties. Attempts in the prior art to develop a ballistic helmet incorporating such materials have been unsuccessful in that mass production at relatively low cost has not been feasible.

We have invented an improved protective helmet which overcomes the disadvantages of helmets of the prior art. Our helmet minimizes the danger of injury from fasteners acting as secondary missiles. It prevents bottoming of the hard shell on the wearer's head. Our helmet accomodates a wide range of head sizes. The suspension system of our helmet is readily removable from the rigid shell. Our helmet is lightweight. It permits of the mass production at relatively low cost of a helmet having ballistic properties.

SUMMARY OF THE INVENTION

One object of our invention is to provide an improved protective helmet which overcomes the disadvantages of protective helmets of the prior art.

Another object of our invention is to provide an improved protective helmet which minimizes the danger of injury from fasteners acting as secondary missiles.

Still another object of our invention is to provide an improved protective helmet in which bottoming of the hard outer shell on the wearer's head is inhibited.

A further object of our invention is to provide an improved protective helmet which accomodates a wide range of head sizes.

Yet another object of our invention is to provide an improved protective helmet construction which permits of the mass production at relatively low cost of a helmet having ballistic properties.

A further object of our invention is to provide an improved protective helmet having a suspension system which can readily be removed for cleaning or replacement.

A still further object of our invention is to provide an improved protective helmet which is lightweight.

Other and further objects of our invention will appear from the following description.

In general our invention contemplates the provision of an improved protective helmet including a suspension frame of relatively rigid material formed with a peripheral channel having a slightly inwardly directed portion at one location therearound, which portion is adapted to receive a slightly outwardly directed portion of the edge of a rigid protective helmet body to permit the body to be swung to a position at which its entire edge is received in the channel and in which position the body can be retained by use of a single fastener. A cord threaded through holes and slots around the periphery of the frame releasably retains the crown structure and the chin strap supports to the frame. A plurality of pouch-forming elements releasably carried by fingers extending upwardly from the frame receive pads which may vary in size to accommodate a range of head sizes.

BRIEF DESCRIPTION OF THE DRAWINGS

In the accompanying drawings which form part of the instant specification and which are to be read in conjunction therewith and in which like reference numerals are used to indicate like parts in the various views:

FIG. 3 is a fragmentary sectional view of our improved protective helmet.

FIG. 4 is a side elevation illustrating the manner in which the body is assembled with the suspension frame in our improved protective helmet.

FIG. 5 is a side elevation of an alternate embodiment of our improved protective helmet.

FIG. 6 is a fragmentary sectional view illustrating the preferred form of helmet body incorporated in our improved protective helmet.

FIG. 7 is a side elevation of our improved protective helmet with the body removed illustrating an alternate form of crown structure which we may employ.

FIG. 8 is a plan view of yet another form of crown structure which we may employ.

FIG. 9 is a fragmentary sectional view of the crown structure illustrated in FIG. 8 taken along the line 9—9 of FIG. 8 and drawn on an enlarged scale.

FIG. 10 is a fragmentary sectional view illustrating one of the features of the crown structure shown in FIG. 8.

DESCRIPTION OF THE PREFERRED EMBODIMENT

Figure 1:
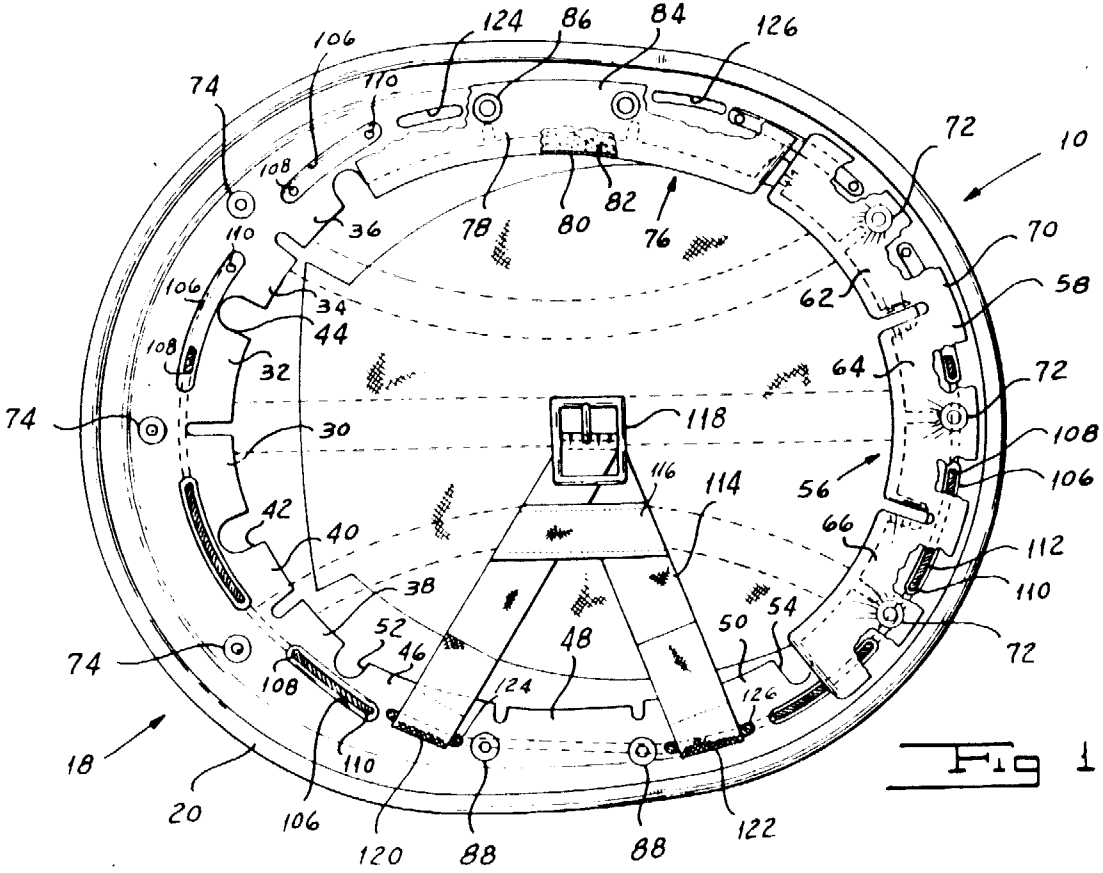
FIG. 1 is a bottom plan view of our improved protective helmet.

Referring now to FIGS. 3, 4 and 6, our improved protective helmet, indicated generally by the reference character 10, includes a body 12 having superior ballistic properties. In its preferred form the body 12 includes respective inner and outer shells 198 and 196 formed from a suitable material such, for example, as a polycarbonate resin provided with a coating of a suitable elastomer which is applied to the shells either by compression molding or by a spray coat or dip coating method. Sandwiched between the shells 196 and 198 is a layer 200 of ballistic material. While any high elongation, high tensile strength fibrous material having a high melting point may be employed, preferably we select one of the "aromids" which include aromatic polyimide resins developed by E. I. duPont de Nemours Company, and sold under the trademarks "Kevlar" and "Nomex." The fibrous material making up the center layer 200 may be woven, or it may be needlepoint felt, or it may be fibrous material loosely bound together by the use of any suitable binder. We form the body with an edge 14 having a slightly outwardly-directed portion 16 at the front of the helmet.

Figure 2:
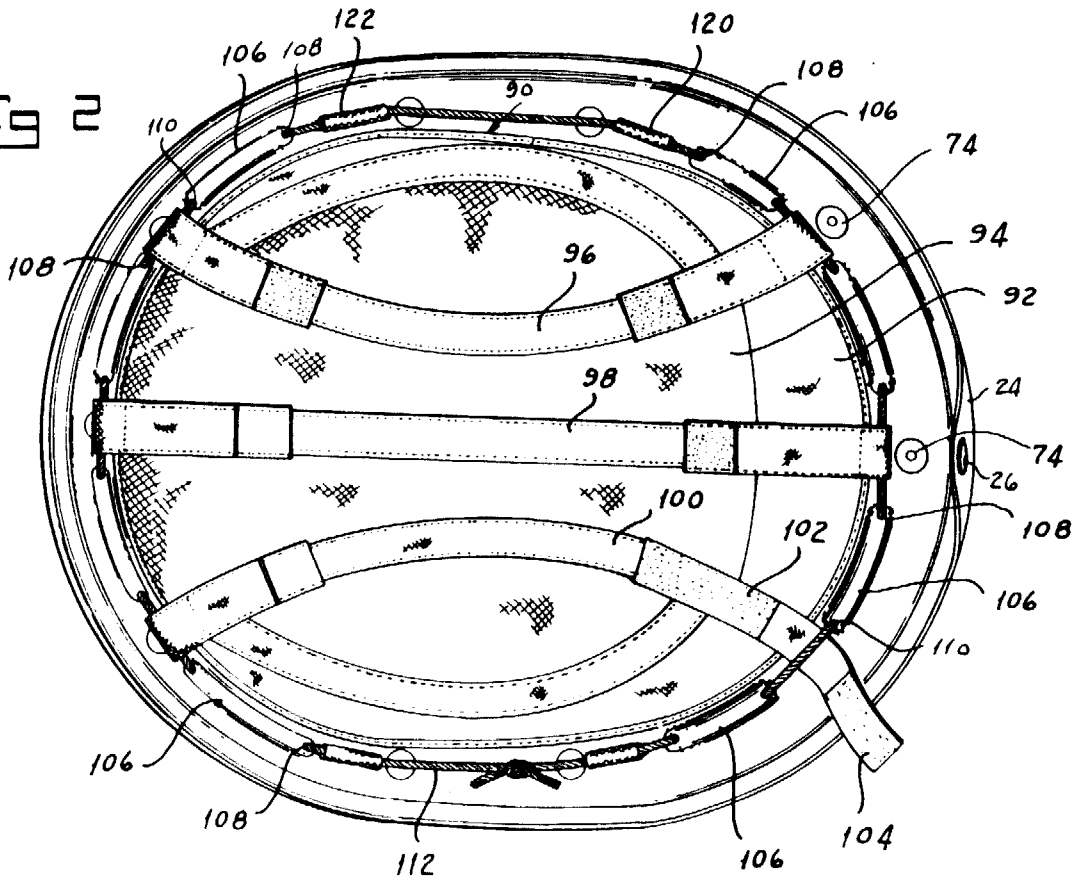
FIG. 2 is a top plan view of our improved protective helmet with the outer helmet body removed.

Referring now to FIGS. 1 to 4, our helmet includes a suspension frame 18 formed of any suitable synthetic resin. This frame 18 has a peripheral channel 20, a portion 22 of which adjacent to the front of the frame is slightly inwardly directed. In assembling the body 12 on the frame 18, the edge portion 16 is inserted in the channel portion 22 in the manner illustrated in FIG. 3, and the helmet body can then be swung down to a position at which the edge 14 is received in the channel 20 around the entire periphery of the helmet. When the body 12 has thus been assembled on the frame 18, it can securely be held in assembled relationship by use of a single fastener. In the particular embodiment illustrated in the drawings, an upwardly-directed extension 24 at the back of the frame 18 carries a female fastener element 26 adapted to receive a male fastener element 28 secured to the hard outer shell. It will readily be appreciated that we have thus provided an assembly of a suspension frame and ballistic body with the use of only a single fastener.

We form each of the back and front of the frame 18 with a plurality of pairs of upwardly-directed extensions or fingers 30 and 32, 34 and 36, and 38 and 40. Relatively wide gaps 42 and 44 separate the central group of fingers [34] *30* and [36] *32* from the outer groups of fingers [30] *34* and [32] *36* and 38 and 40 at the back and at the front of the frame 18.

In addition to the fingers at the front and at the back of the frame, we provide three side fingers 46, 48 and 50 on each side of the frame 18. Relatively larger spaces 52 and 54 separate the side fingers from the front and back fingers for a reason to be described more fully hereinbelow. Preferably the fingers 30, 32, 34, 36, 38, 40, 46, 48 and 50 all are molded integrally with the channel-forming portion 20 of the frame 18.

While the material of which the frame is formed is relatively rigid, the upwardly directed fingers are thin and are thus somewhat resilient. Further, as will more fully be understood from the description hereinbelow, the fingers and the portion of the frame connecting the fingers to the channel 20 serve to hold the ballistic shell 12 in spaced relationship to the wearer's head. Moreover, these parts of the frame 18 prevent bottoming of the helmet on the wearer's head in response to a blow on the side of the outer shell. Thus the wearer's head is protected against injury which might otherwise result from the hard outer shell being driven into engagement with his head.

We provide our helmet with front and back pad-carrying envelopes, the front one of which is indicated generally by the reference character 56. Envelope 56 includes an inner skin 58 and an outer skin 60 which may be cut from a single piece of a suitable material such, for example, as glove leather, and stitched to form three compartments 62, 64 and 66. Each of the compartments 62, 64 and 66 carries an insert 68 of any suitable relatively soft material such, for example, as foamed natural or synthetic rubber. The envelope 56 is assembled on the frame by slipping the outer skin 60 over the front fingers 30, 32, 34, 36, 38 and 40 so that each of the compartments 62, 64 and 66 receives one set of fingers and so that the edges of the compartment-forming portions of the envelope 56 are received in the spaces 42 and [40] *44*. This assembly operation further is carried out so that the insert pads 68 are disposed inside of the fingers. We provide the inner skin 58 with a flap 70 carrying a plurality of female snap fastener elements 72 adapted to receive male snap fastener elements 74 secured to the frame 18.

In addition to the front and rear envelopes 56, our helmet includes a pair of side envelopes 76, each of which is made up of an inner skin 78 and an outer skin 80, which may be cut and stitched from a single piece of suitable material such as glove leather to form a compartment for receiving an insert 82 made of foam rubber or the like. In assembling the envelope 76 on the frame 18, the outer skin 80 is slipped over the fingers 46, 48 and 50 so that the side edges of the envelope are received in the spaces 52 and 54 and so that the pad 82 is inside of the fingers. A flap 84 on the [outer] *inner* skin 78 of the envelope 76 carries a plurality of spaced female snap fastener elements 86 adapted to engage male fastener elements 88 carried by the frame 18.

It will readily be appreciated that the envelopes 56 and 76 may manually be applied to the frame 18 and may manually be removed therefrom. This operation permits of the insertion of pads 68 and 82 of different sizes, or of different numbers of pads, to accomodate a wide range of head [sized] *sizes*. In addition, the removable feature of the envelope permits cleaning and replacement of worn parts.

Our protective helmet includes a crown structure, indicated generally by the reference character 90, which may be any one of a number of variations of a basic crown structure. In the particular crown structure 90 illustrated in FIGS. 1 to 4, a relatively closely-woven fabric is cut and stitched to form the peripheral portion 92 of the crown structure 90. We stitch or otherwise secure a central mesh portion 94 to the peripheral portion 92 to ensure adequate ventilation. In the crown structure 90 there are three crown straps 96, 98 and 100. The crown strap 98 is stitched to the peripheral and central portions [90] *92* and [92] *94* so that it extends generally in a fore-and-aft direction over the wearer's head. The other two crown straps 96 and 100 are slightly curved so as to extend over the wearer's head adjacent to the sides thereof. Each of the crown straps 96, 98 and 100 has two free ends, each of which carries a length 104 of readily releasable attaching elements adapted to cooperate with a pad 102 of complementary elements secured to the strap at a location somewhat inboard of the free end. One type of fastener which may be used is made by the American Velcro Company and sold under the trademark "Velcro." In that form of fastener, the length 102 may comprise a plurality of minute loops of synthetic resin adapted to be engaged by a plurality of minute hooks of synthetic resin carried by the pad or length 104. As will be more fully understood from the description hereinbelow, the elements of the length 104 are engaged with the elements of length 102 to form a loop in the end of the crown strap.

In forming the frame 18, we provide a plurality of elongated recesses 106 on the inner surface of the portion of the frame which joins the fingers described hereinabove with the channel portion 20 of the frame. In the particular embodiment shown in the drawings, there are four such recesses spaced along the front of the frame and four spaced along the back of the frame. We provide each recess with a pair of holes 108 and 110 adjacent to the ends thereof. A strong cord 112, formed of any suitable material such, for example, as braided nylon yarn, is adapted to be threaded through the holes 108 and 110 so that portions thereof lie in the recesses 106 and other portions extend over the upper surface of the frame 18 between the holes 106 and 108. The portions of the cord 112 extending over the upper surface between adjacent recesses at the front and back of the frame 18 are adapted to receive the loops formed in the ends of the straps 96, 98 and 100 by the fastener elements 102 and 104.

Our helmet includes left and right hand chin strap supports, each of which may be made up of a length of nylon webbing *114* folded to form a vee, the legs of which are connected by a crosspiece 116 secured to the webbing 114. The portion of the webbing 114 at the apex of the vee receives a securing element of any suitable type such, for example, as a buckle 118. We stitch or otherwise secure the ends of the legs of the vee back on the lengths of the legs to form a pair of loops 120 and 122. Further in the course of formation of the frame 18, we cut a pair of slots 124 and 126 in the side portions of the frame above the channel. The cord 112 is adapted to pass inwardly through each of these slots so as to be received by one of the loops 120 and then pass back out through the slot, thus to hold the chin strap support securely to the frame.

Referring now to FIG. 5, an alternate embodiment of suspension frame, indicated generally by the reference character 128, is similar to frame 18 in that it is provided with the pairs of front and rear upward extensions or fingers. Moreover, it is adapted to be assembled with a body such as the body 12 in the same manner as is the frame 18. In the frame 128, however, rather than providing side extensions, we form the frame with a pair of earcup supports 130 extending upwardly from the inside of the peripheral channel in the frame 128. Each of the earcup supports 130 is provided with an opening 132 through which a screw 136, or the like, extends to secure an earcup assembly 134 to the support 130. We dispose a cup-like washer 138 between the head of the screw 136 and the outer surface of the support 130. In this way, the earcup assembly 134 is positioned on the support in such a way that its position on the support can be adjusted and, in addition, its relative orientation around the axis of screw 136 can be adjusted.

Referring now to FIG. 7, an alternate form of suspension which we may employ, indicated generally by the reference character 140, includes a crown portion 142 which is a mesh-like structure molded from polypropylene and formed with integrally molded front strap elements 144 and rear strap elements 146 for attaching the suspension 140 to the frame 18. In order to accommodate a range of headsizes, we form each of the strap elements 144 and 146 with a plurality of vertically spaced passages 148, 150 and 152. In assembling the suspension 140 with the shell 118 the cord 112 is passed through corresponding passages of the strap elements 144 and 146.

Referring now to FIG. 8, still another form of suspension which we may employ is indicated generally by the reference character 154. Suspension 154 includes a central portion 156, a front arm 158 formed with a strap part 160, a rear arm 162 formed with a strap part 164 and side arms 166, 168, 170, 172, 174 and 176, each of which is formed with a strap portion 178. It will readily be appreciated that, if desired, the central portion 156 may be formed as a perforated or mesh structure for lightness and ventilation.

We provide the suspension 154 with means for adjustably interconnecting the various outward-extending portions thereof in such a way as to accommodate a variety of headsizes. This means includes a plurality of molded strips 180 adapted to connect the front arm 158 to side arms 170 and 176, and adapted to connect the rear arm 162 to side arms 166 and 172. We provide the various arms with a pattern of holes 186 acting as female connector elements. Each of the elements 180 is formed with [know-like] *knob-like* elements 184 adapted to be received in the holes 186 to connect the front and back arms to the adjacent side arms. It will readily be appreciated that these connections can be changed by changing the holes 186 which receive the knobs 184. In addition to the elements 180, we provide a plurality of elements 182 for connecting adjacent ones of the side arms of the suspension 154. Each of the members 182 is provided with knobs 184 adapted to be received in holes 186 to connect adjacent ones of the side arms each to the other.

We provide each of the strap portions 160, [166] *164* and 178 of the arms of the crown structure 154 with a plurality of spaced rows of spaced knob-like connector elements 188. Adjacent rows of the elements 188 are separated by lines 190 along which the strap portion is reduced in thickness to facilitate folding of the strap portion. Inwardly of the [know] *knob* elements 188 we provide rows of holes 192 adapted to cooperate with the knob-like elements to attach the strap parts such as the part 160 to the cord 112.

In assembling the components of the form of our improved protective helmet 10 illustrated in FIGS. 1 to 4, the cord 112 first is threaded through the openings 108 and 110 and into and out of the slots 124 and 126 with the length of cord 112 between the holes 108 and 110 of each pair lying in the recess 106 and with the portion of the cord on the upper surface of the frame 18 between holes 108 and 110 of an adjacent pair being threaded through a loop of one of the crown straps. In a similar manner, as the cord 112 passes into and out of a slot 124 or 126, it is threaded thorugh the loop 120 or 122 in the end of the chin strap support webbing 114. When the [chain] *chin* strap supports and the crown assembly have thus been attached to the frame, the ends of the cord may be joined as by tying them together.

Pads 68 and [80] *82* of a thickness which will best suit the head of the particular wearer are inserted in the pockets of the pocket-forming members. The pocket-forming members next are slipped over the fingers or upward extensions on the frame and the fasteners on the pockets are engaged with the fastener elements on the frame securely to hold the pads in position.

At this point the entire suspension assembly [fis] *is* ready to be assembled with the body 12. In order to accomplish this operation, the slightly outwardly-directed portion 16 of the body 12 is inserted into the slightly inwardly-directed portion 22 of the channel 20 of the frame 18. When that has been done in the manner illustrated in FIG. 4, the body is swung downwardly to a position at which the edge thereof is received in the channel 20 around the entire periphery thereof. In this position of the parts, the fastener elements 26 and 28 can be engaged so as securely to hold the body 12 in assembled relationship with the frame 18.

When using the crown structure 140 shown in FIG. 7, in the course of threading the cord 112 through the openings in the frame it is selectively drawn through the passages 148, 150 and 152 so as best to accommodate the head size of the person for whom the helmet is intended. It is to be understood that, alternatively to providing the crown structure 140 with strap elements having the passages 148, 150 and 152, we may provide the structure 140 with strap elements having spaced rows of the male connector elements 188 separated by the bend lines 190 and adapted selectively to be engaged in holes 192 to form a passage for the cord 112. It will be appreciated that the passage is selectively formed at such a location along the length of the strap as will best accommodate the wearer's head. It will be understood, moreover, that the operation of forming the passages using the connector elements 188 and holes 192 may be accomplished after the cord 112 has been threaded onto the frame 18.

When the crown structure 154 is employed, the outwardly extending arms [150] *158*, 162, 166, 168, 170, 172, 174 and [178] *176* first are interconnected by the elements 180 and 182. In performing this operation the connector elements 184 are selectively engaged in holes 186 in such a way that a crown structure 154 sized to the wearer's head is provided. The strap portions 160, 164 and 178 then are assembled onto the cord 112 in the manner described hereinabove.

In use of our improved protective helmet, the helmet is held on the wearer's head by any suitable chin strap supported on the frame by the lengths of webbing 114. Owing to the upwardly-directed extensions on the frame 18, in response to the force of impact of a blow or the like on the helmet, the helmet cannot bottom on the wearer's head. The force of impact will be absorbed by the upwardly-directed extensions which are in some degree flexible. In the event that it is desired to put larger pads in the pocket-forming elements, or to put a number of pads therein to accommodate a smaller head size, the pocket-forming members can readily be detached from the frame. Similarly, in the event that it becomes desirable to clean or to replace or repair the crown structure, it can be removed from the frame by untying the cord 112 after the body 12 has been disassembled from the frame 18.

It will be seen that we have accomplished the objects of our invention. We have provided an improved protective helmet which overcomes the defects of protective helmets of the prior art. Our protective helmet minimizes the danger of injury from fastener elements acting as secondary missiles. It prevents bottoming of the outer shell on the wearer's head in response to the force of the impact of a blow or the like on the shell. It readily accommodates a very wide range of head sizes. The parts thereof can be assembled and disassembled manually for cleaning, repair, replacement or the like. Our invention permits of the mass production at relatively low cost of a helmet having ballistic properties.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a protective helmet an assembly including a hard body having a peripheral edge *with an outwardly directed portion*, a suspension frame *of relatively rigid material*, [means on] said frame [forming] *being formed with* an upwardly opening peripheral channel adapted to receive said edge, *said channel having an inwardly directed portion adapted to receive said outwardly directed portion of said edge, at least one of said portions being of such limited circumferential extent as to permit said body to be assembled on said frame without substantial deformation of said channel by inserting said edge portion in said channel portion and then swinging said body to a position at which the remainder of said edge is received in the remainder of said channel*, and means for [assembling] *retaining* said body [on] *in assembled relationship with* said frame.

2. An assembly as in claim 1 in which said [assembling] *retaining* means is readily manually releasable.

[3. An assembly as in claim 1 in which said assembling means comprises an inwardly-directed portion of said channel and an outwardly-directed edge portion of said body adapted to be received in said channel portion.]

4. An assembly as in claim 1 in which said [assembling] *retaining* means comprises a single manually-operable fastener.

[5. An assembly as in claim 1 in which said assembling means comprises an inwardly-directed portion of said channel, an outwardly directed edge portion on said body received in said channel portion and a single manually-operable fastener.]

6. An assembly as in claim [5] *4* in which said channel and [body] *edge* portions are generally oppositely located with respect to said fastener.

7. An assembly as in claim 6 in which said [assembling] *retaining* means comprises an upwardly-directed extension on said channel, and in which said fastener comprises a fastener element on said extension.

8. An assembly as in claim 1 including a plurality of upwardly-directed fingers on said frame within said body.

9. An assembly as in claim 8 in which said fingers are spaced inwardly of said body to inhibit bottoming of said body on the head of a wearer in response to the force of an impact on said body.

10. An assembly as in claim 9 including a plurality of pads of resilient material and means for detachably mounting said pads on said fingers between the fingers and the head of a wearer.

11. An assembly as in claim 10 in which said pad-mounting means comprises means forming pockets for receiving said pads and means for detachably securing said pocket-forming means to said frame.

12. An assembly as in claim 11 in which said pockets are adapted to be slipped over said fingers and in which said pocket-forming means comprises a flap and in which said securing means comprises means for releasably fastening said flap to said frame.

13. An assembly as in claim 1 including a crown structure and means for detachably connecting a crown structure and means for detachably connecting said crown structure to said frame.

14. An assembly as in claim 13 in which said crown structure comprises a crown strap, said connecting means comprise means forming loops in the ends of said crown strap and means carried by said frame for receiving said strap loops.

15. An assembly as in claim 14 in which said strap loop receiving means comprises a length of cord carried by said frame.

16. An assembly as in claim 15 in which said frame is formed with a plurality of spaced holes, said cord being threaded through said holes, a portion of said cord extending between adjacent holes receiving said crown strap loop.

17. An assembly as in claim 16 including means for adjusting the effective length of said crown strap.

18. An assembly as in claim 1 including a central mesh portion and straps extending from the periphery of said mesh portion and means for attaching said straps to said frame.

19. An assembly as in claim 18 in which said means for attaching said straps to said frame includes means forming channels in said straps and a cord-like element on said frame passing through said channels.

20. An assembly as in claim 19 in which each of said straps is formed with a plurality of spaced channels, said cord being selectively received in a corresponding one of said channels in each of said straps.

21. An assembly as in claim 1 including a crown structure and a plurality of straps extending from the periphery of said crown structure, each of said straps comprising means for attaching its end remote from said periphery to a point along the length of the strap to form a channel therein, and means on said frame adapted to be received in said channel to secure said crown structure to said frame.

22. An assembly as in claim 21 in which said channel forming means are adjustable to adjust the effective lengths of said straps.

23. An assembly as in claim 22 in which said [loop] *channel* forming means is manually operable.

24. An assembly as in claim 23 in which said channel forming means comprises a plurality of knob-like male connector elements on said strap and a plurality of holes in said strap for receiving said knob-like elements.

25. An assembly as in claim 1 including a crown structure comprising a central portion, front and rear and side arms extending outwardly from said central portion and means for adjustably connecting said front and rear arms to said side arms at points along the lengths thereof.

26. An assembly as in claim 25 in which said crown structure comprises a plurality of left side arms and a plurality of right side arms, and means for adjustably connecting adjacent ones of said right *side* arms and said left side arms to each other at points along the length thereof.

27. An assembly as in claim 26 in which said connecting means comprises connector pieces extending between said arms, male connector elements on one of the pieces and arms, and holes in the other of the pieces and arms for receiving said connector elements.

28. An assembly as in claim 27 including respective strap lengths extending from the ends of said arms, means for forming loops at the ends of said arms and means on said frame adapted to be received in said loops.

29. An assembly as in claim 1 in which said body comprises respective hard inner and outer shells and a layer of ballistic material comprising high elongation high tensile strength fibrous material.

30. An assembly as in claim 29 in which said fibrous material is made from an aromatic polyimide resin.

31. An assembly as in claim 30 in which said shells comprise a polycarbonate resin.

32. An assembly as in claim 31 in which said shells are coated with an elastomer.

33. An assembly as in claim 1 including a chinstrap support and means for detachably connecting said chinstrap support to said frame.

34. An assembly as in claim 33 in which said chinstrap support comprises a length of fabric formed with a loop in the end thereof and means on said frame for receiving said loop.

35. An assembly as in claim 33 in which said loop-receiving means comprises a cord on said frame.

36. A protective helmet assembly including in combination, an outer body comprising ballistic material formed with an edge, a *resilient* suspension frame formed with a peripheral channel conforming to the configuration of the edge of said body and formed with a plurality of [upwardlydirected] *upwardly-directed independently flexible* extensions spaced inwardly of said channel, means for attaching said body to said frame with said edge disposed in said channel, a plurality of pads, means for mounting said pads on said extensions between the extensions and the head of the wearer, a crown assembly and means for attaching said crown assembly to said frame.

37. A protective helmet assembly as in claim 36 in which spacer pad mounting means manually releasably mounts said pads on said frame.

38. A protective helmet assembly as in claim 36 in which said body attaching means detachably secures said shell to said frame and in which said crown assembly attaching means readily detachably secures said crown structure to said frame.

39. A protective helmet assembly as in claim 36 in which said body attaching means detachably secures said shell to said frame and in which said pad-mounting means removably mounts said pads on said extensions and in which said crown structure attaching means detachably secures said crown structure to said frame.

40. A protective helmet assembly as in claim 36 in which said extensions are disposed around substantially the entire periphery of said frame to prevent bottoming of said body on the wearer's head under the force of an impact on said body.

41. A protective helmet assembly as in claim 36 in which said extensions are disposed generally along the front and rear of said frame and in which said frame is formed with earcup supports.

42. A protective helmet assembly including in combination, a body comprising ballistic material and having an edge formed with a slightly outwardly-directed portion at one location therearound, a suspension frame of relatively rigid material formed with a peripheral channel conforming to the configuration of said body edge and having a slightly inwardly-direction portion at a location therearound corresponding to the location of said body portion, said channel portion adapted to receive said body portion to permit said body to be swung to an assembled position at which said body edge is received in said channel, means for releasably holding said body in said attached position, said frame being formed with a plurality of upwardly-directed extensions spaced inwardly of said channel so as to lie relatively closely adjacent to the head of a wearer, pocket-forming means adapted to be slipped over said extensions, spacers of resilient material in said pocket-forming means between said extensions and the wearer's head, means for detachably securing said [envelope-forming] *pocket-forming* means to said frame, a crown structure comprising a crown strap having loops in the ends thereof, and means on said frame for releasably receiving said loops.

43. A protective helmet assembly as in claim 42 in which said frame is formed with a plurality of holes spaced around said frame, and in which said loop receiving means comprises a cord threaded through said openings, portions of said cord between adjacent openings receiving said loops.

44. A protective helmet assembly as in claim 43 including a chinstrap support comprising a length of material having a loop in the end thereof, said frame being formed with a slot, a portion of said cord extending through said slot being threaded through said chinstrap support length loop.

45. A protective helmet as in claim 42 in which said extensions are disposed around substantially the entire periphery of said frame to prevent bottoming of said body on the wear's head under the force of an impact of said body.

[46. In a protective helmet an integrally formed crown structure comprising a central mesh-like portion, a plurality of straps around said central portion and means forming respective passages in said straps.]

[47. A structure as in claim 46 including means forming a plurality of spaced passages in each of said straps.]

[48. A structure as in claim 46 in which said passage forming means is adjustable.]

[49. A structure as in claim 48 in which said passage forming means comprises a plurality of knob-like connector elements at one location along the length of each strap and a plurality of holes at other locations along the length of said strap, said holes adapted selectively to receive said connector elements to permit adjustment of the effective length of a strap.]

50. In a protective helmet a crown structure including an integrally formed member comprising a central portion and front and back and side arms extending outwardly therefrom, *a frame, means for securing said arms to said frame,* and means for adjustably connecting said front and back arms to said side arms at points along the lengths of said arms *intermediate said central portion and said frame.*

51. [A] *In a protective helmet a* crown structure [as in claim 50 in which] *including an integrally formed member comprising a central portion and front and back and side arms extending outwardly therefrom, and means for adjustably connecting said front and back arms to said side arms at points along the lengths of said arms,* said connecting means [comprises] *comprising* a respective connector element associated with each pair of arms to be connected, male connector elements on one of said connector elements and said pair of arms, and a plurality of holes in the other of said connector elements and said pair of arms for selectively receiving said connector elements.

52. A crown structure as in claim 51 in which said member comprises straps extending outwardly from the ends of said arms and means forming loops in said straps.

53. A crown structure as in claim 52 in which said loop-forming means comprises selectively interengageable connector elements on said strap for adjusting the effective length of said strap.

54. A crown structure as in claim 52 in which said member comprises a plurality of left side arms and a plurality of right side arms, said structure including connectors for adjustably joining adjacent side arms at points along the length thereof.

*55. An assembly as in claim 1 in which both of said portions are of limited circumferential extent.*

* * * * *